(12) United States Patent
Yong-Chang

(10) Patent No.: US 6,450,074 B1
(45) Date of Patent: Sep. 17, 2002

(54) ASSEMBLY FOR BINDING AND LOCATING AN ADDED HEAD OF NUMERICAL MACHINE TOOL

(75) Inventor: Kuan Yong-Chang, Tao Yuan Hsien (TW)

(73) Assignee: Awea Mechantronic Co., Ltd., Hsin Chu (TW)

( * ) Notice: Subject to any disclaimer, the term of this patent is extended or adjusted under 35 U.S.C. 154(b) by 97 days.

(21) Appl. No.: 09/654,344

(22) Filed: Sep. 1, 2000

(51) Int. Cl.$^7$ .............................. B23B 7/00; B23B 29/00
(52) U.S. Cl. .............................. 82/154; 82/158; 82/160; 82/120; 409/230
(58) Field of Search .......................... 82/158, 159, 154, 82/160, 161, 173, 120, 139, 152, 142; 409/230, 231, 232

(56) References Cited

U.S. PATENT DOCUMENTS

| | | | | |
|---|---|---|---|---|
| 3,844,028 A | * | 10/1974 | Hague et al. | 29/568 |
| 5,490,772 A | * | 2/1996 | Gaigl | 425/126.1 |
| 5,579,975 A | * | 12/1996 | Moorman | 227/8 |
| 5,887,339 A | * | 3/1999 | Schmidt | 29/715 |
| 6,245,003 B1 | * | 6/2001 | Pollington | 483/59 |

\* cited by examiner

*Primary Examiner*—Henry Tsai
(74) *Attorney, Agent, or Firm*—Bacon & Thomas, PLLC

(57) ABSTRACT

An assembly for fastening and locating an added head of a numerical machine tool comprises two cylinder mounts located in the periphery of a main shaft of the numerical machine tool. A piston is movably disposed between the two cylinder mounts such that the piston is driven by the hydraulic-pneumatic loops to move up and down so as to control the movement of an engagement block for retaining a retaining block of the added head. The main shaft of the numerical machine tool is provided with a crank-tooth coupler to facilitate the adjusting of the angular position of the added head in accordance with the operational requirement for processing a workpiece.

5 Claims, 10 Drawing Sheets

Fig • 1

PRIOR ART

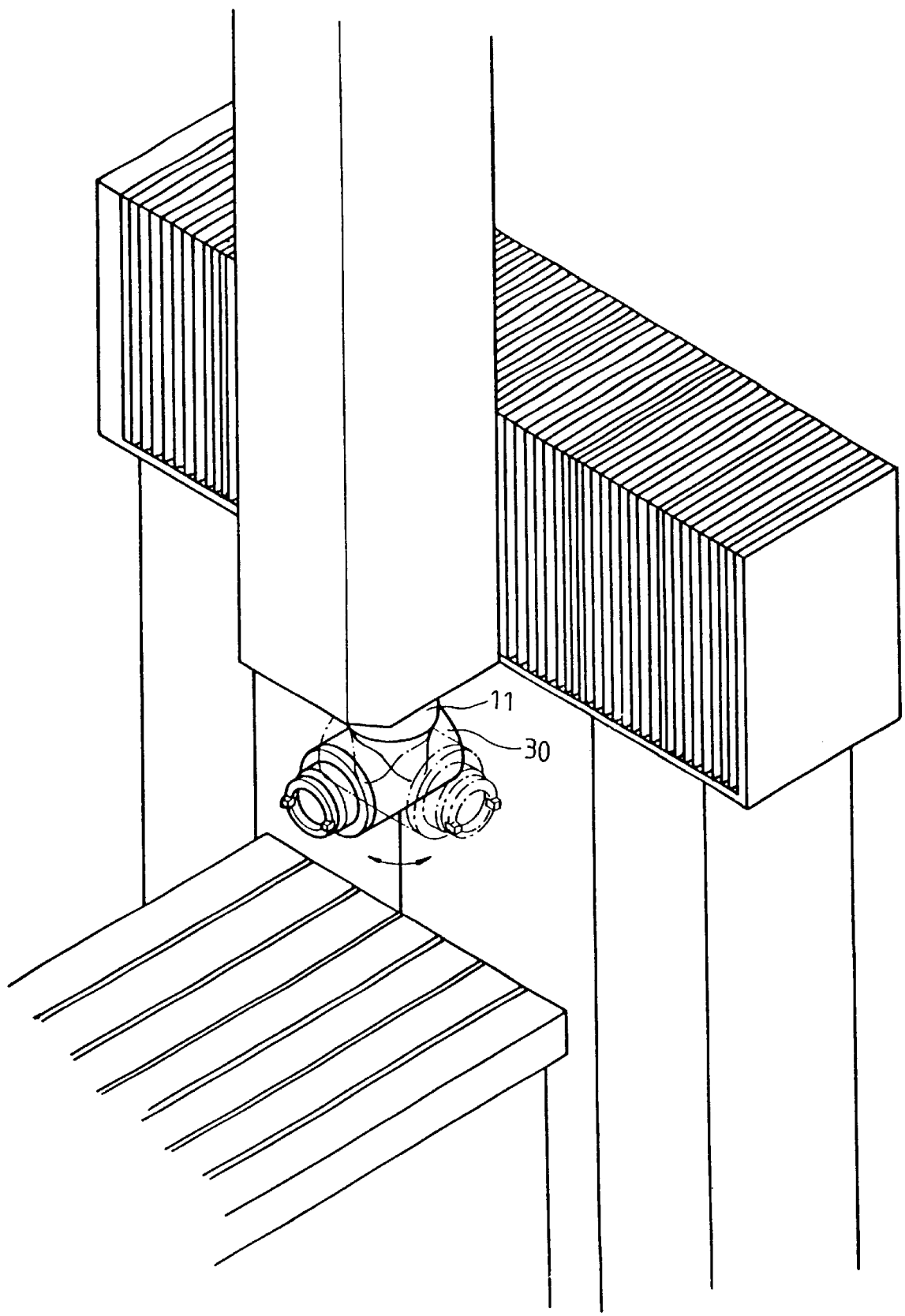
Fig · 9

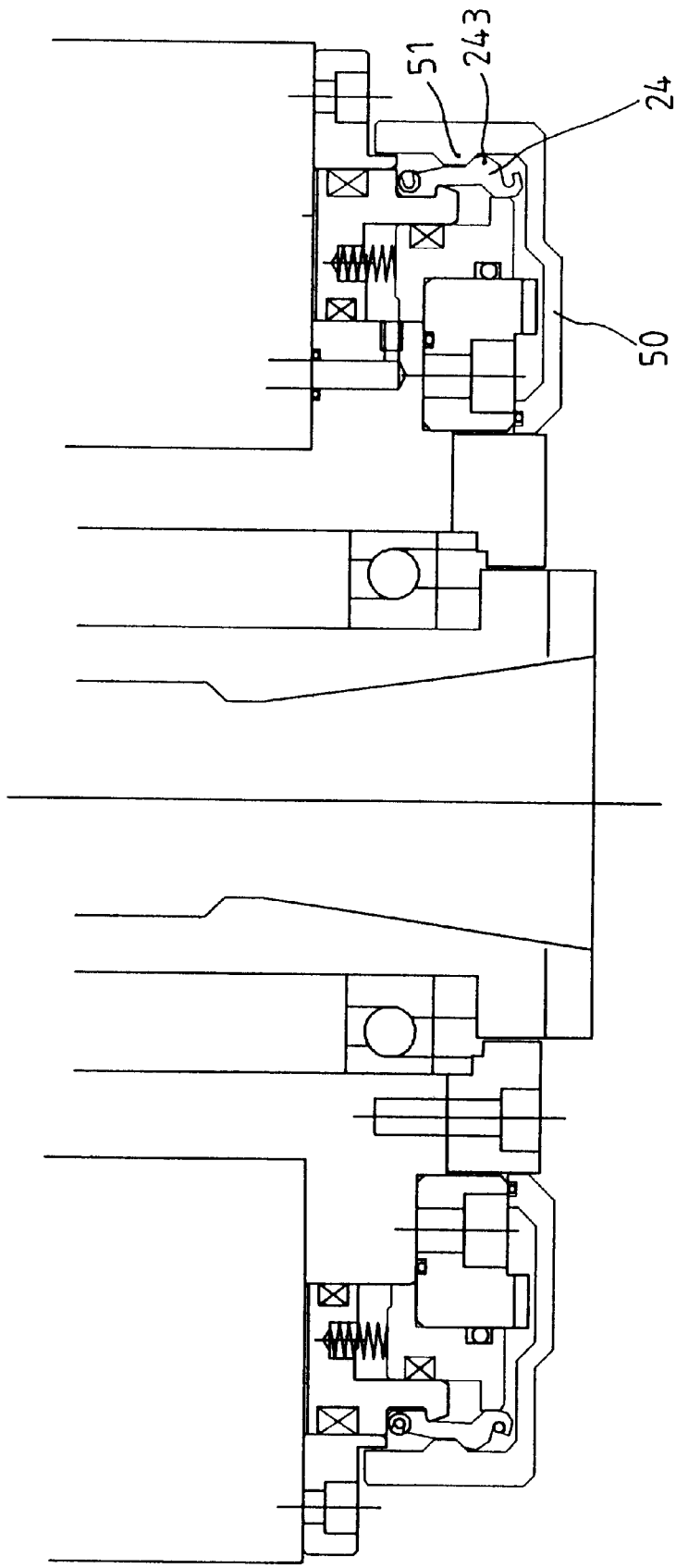
Fig · 10

ASSEMBLY FOR BINDING AND LOCATING AN ADDED HEAD OF NUMERICAL MACHINE TOOL

FIELD OF THE INVENTION

The present invention relates generally to a numerical machine tool, and more particularly to a hydraulic-pneumatic loop control device for binding and locating an added head of the numerical machine tool.

BACKGROUND OF THE INVENTION

The upright numerical machine tool is commonly used in the industry. In operation, the tool is directly fitted under the process main shaft head of the machine body to work on a workpiece in an upright manner. In the event that the workpiece must be processed sideways, at a specific angle, or by extending the main shaft nose, the numerical machine tool must be provided with an added head to facilitate the operating of the numerical machine tool. The conventional way for mounting an added head on the numerical machine tool is generally done by the fastening bolts. As shown in FIGS. 1 and 2, a main shaft 1 is provided in the underside with a plurality of threaded holes 2. An added head 3 is provided in the top with a plurality of bolt holes 4 corresponding in location to the threaded holes 2 of the main shaft 1. In the process of mounting the added head 3, a tool retainer 6 in the main shaft 1 is used to retain a tool sleeve 7 of the top of the added head 3 such that the added head 3 is suspended. Thereafter, the added head 3 is fastened with the main shaft 1 by a plurality of fastening bolts 5 which are engaged with the threaded holes 2 of the main shaft 1 via the bolt holes 4 of the added head 3. Such a conventional fastening method as described above is rather inefficient and time-consuming at best. In addition, the threaded holes 2 of the main shaft 1 and the bolt holes 4 of the added head 3 must be made with precision at additional cost. Furthermore, the added head 3 must be repeatedly adjusted and fastened so as to facilitate the operating of the added head 3 at various angles. It is therefore readily apparent that the conventional way of fastening the added head 3 with the main shaft 1 is not cost-effective.

SUMMARY OF THE INVENTION

It is therefore the primary objective of the present invention to provide a hydraulic-pneumatic loop control device for fastening an added head with the main shaft of a numerical machine tool. The device comprises two cylinder mounts and a piston located between the two cylinder mounts. The piston is provided with a hydraulic trough and a pneumatic through, which are in communication with a hydraulic-pneumatic loop. The piston is linked at the lower end with an engagement block. The piston is driven to displace by the hydraulic-pneumatic loop so as to control the engagement and the disengagement of the engagement block with a retaining block of the added head. In the process of mounting the added head, the added head is first place on the machine stand before the piston is driven by the hydraulic-pneumatic loop so as to actuate the engagement block to move downwards, thereby causing the engagement block to move away from the urging portion of the lower cylinder. In the meantime, the main shaft makes use of a numerical servocontrol to move downward such that a tool retainer catches the top of a tool sleeve of the added head, and that the retaining block of the added head is located at a standby position. As the piston is driven by the hydraulic-pneumatic loop to cause the engagement block to rise such that the engagement block is pressed by the urging portion of the lower cylinder, and that the engagement block is engaged with the retaining block of the added head. The device of the present invention is efficient and devoid of the fastening bolts of the prior art.

It is another objective of the present invention to provided a device for fastening an added head with the main shaft of a numerical machine tool. The main shaft and the added head are provided with a crank-tooth coupler to facilitate the adjusting of the processing angle of the added head with ease and speed.

It is still another objective of the present invention to provide a device for fastening an added head with the main shaft of a numerical machine tool. The device is provided with. a spring which is disposed between the piston and the lower cylinder mount for preventing the engagement block from being actuated by the piston to rise at such time when the power outage takes place in the midst of the operation of the numerical machine tool. Such incident can result in the disengagement of the added head with the main shaft of the numerical machine tool.

It is still another objective of the present invention to provided a device for fastening and locating an added head with the main shaft of a numerical machine tool. The device is provided with a protective cover having a retaining portion by means of which the protective cover is retained by the engagement block of the piston.

The foregoing objectives, features, functions, and advantages of the present invention will be more readily understood upon a thoughtful deliberation of the following detailed description of a preferred embodiment of the present invention with reference to the accompanying drawings.

BRIEF DESCRIPTION OF THE DRAWINGS

FIG. 9 shows a schematic view of the added head of the present invention in use.

FIG. 10 shows a schematic view of the protective cover of the device of the present invention.

DETAILED DESCRIPTION OF THE PREFERRED EMBODIMENT

Figure 1:
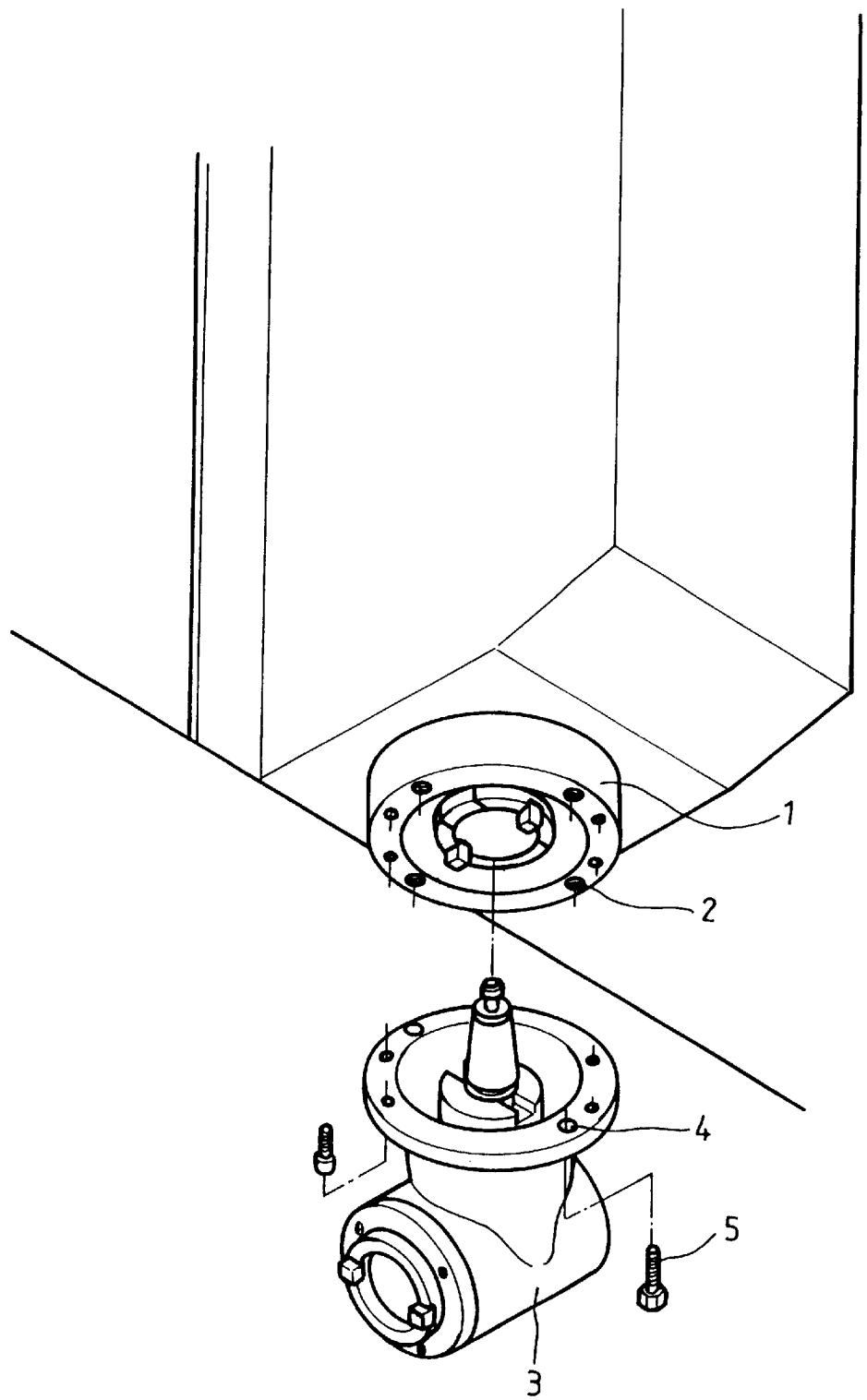
FIG. 1 shows a schematic view of the conventional way by which an added head is assembled with the main shaft of a numerical machine tool.
Figure 2:
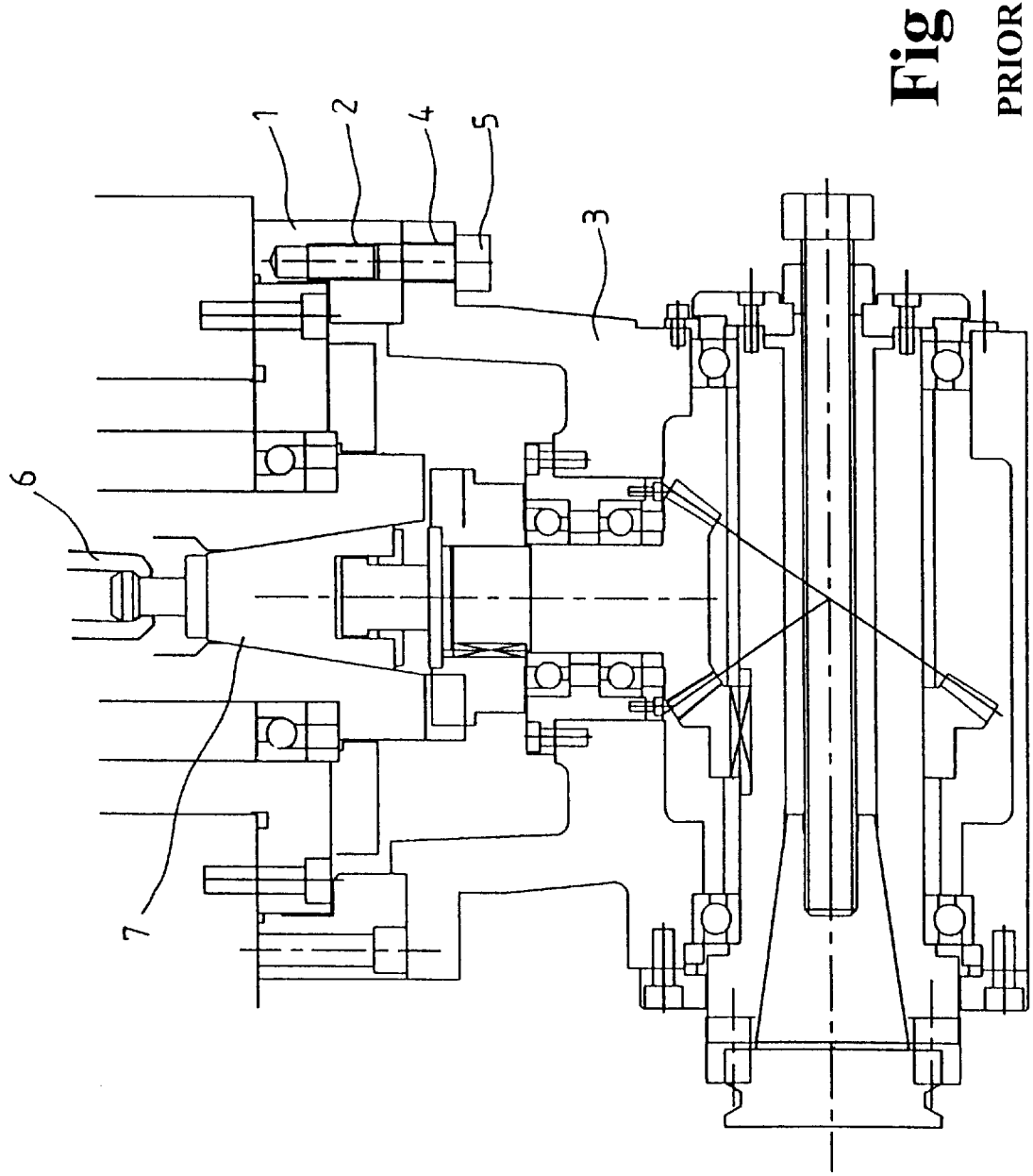
FIG. 2 shows a schematic plan view of a numerical machine tool with an added head being fastened with the main shaft of the numerical machine tool by the conventional way as illustrated in FIG. 1.
Figure 3:
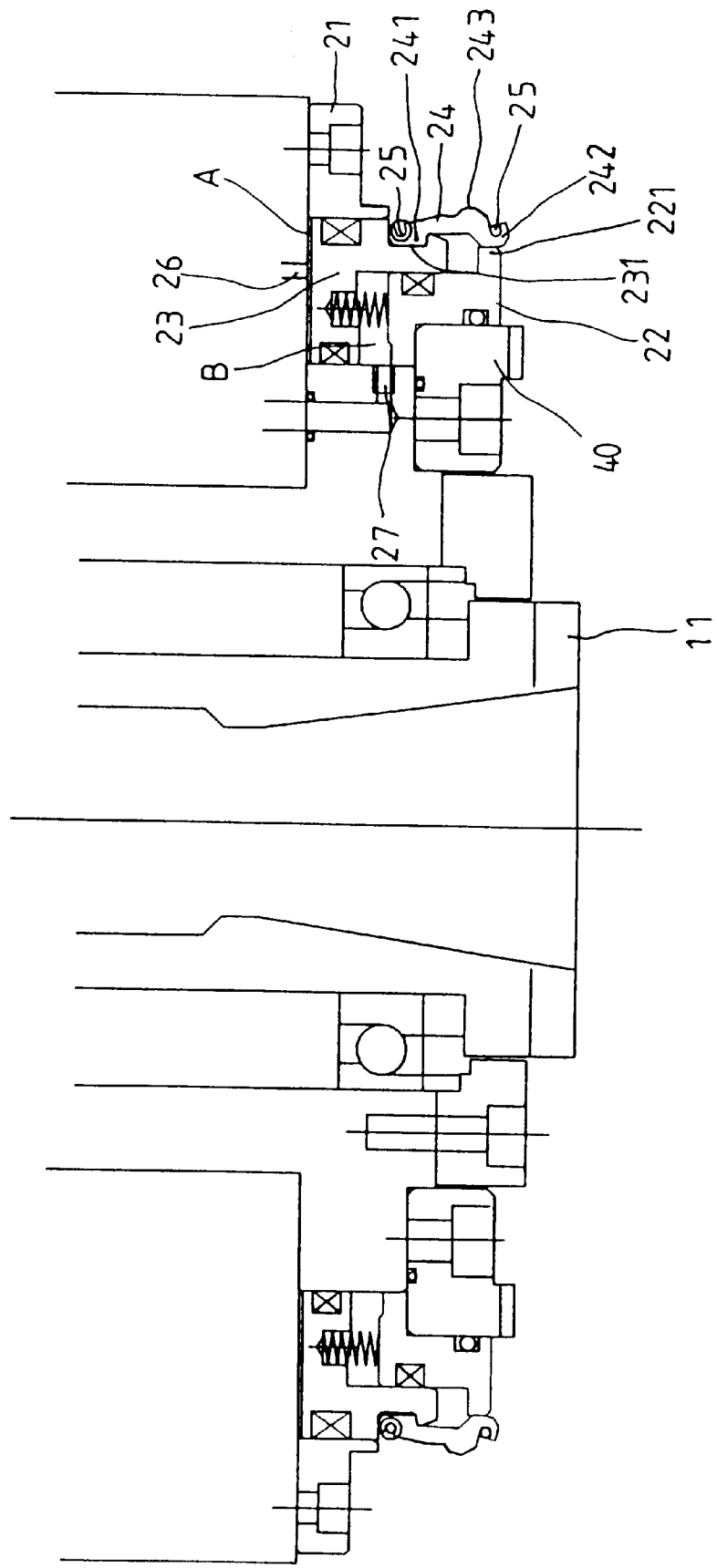
FIG. 3 is a schematic view showing the relationship between a fastening and locating device of the present invention and the main shaft nose of a numerical machine tool.
Figure 4:
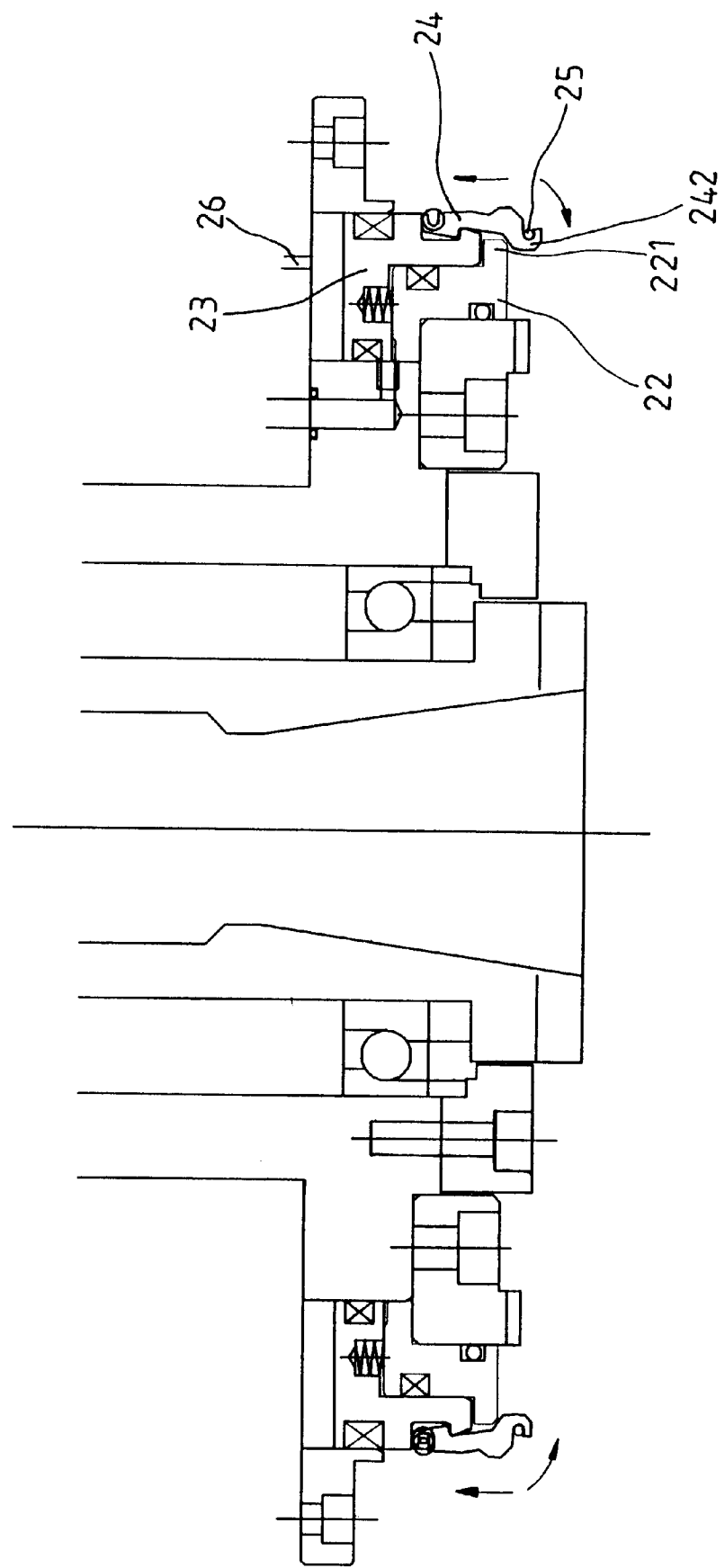
FIG. 4 shows a schematic view of an engagement block of the device of the present invention in action.
Figure 5:
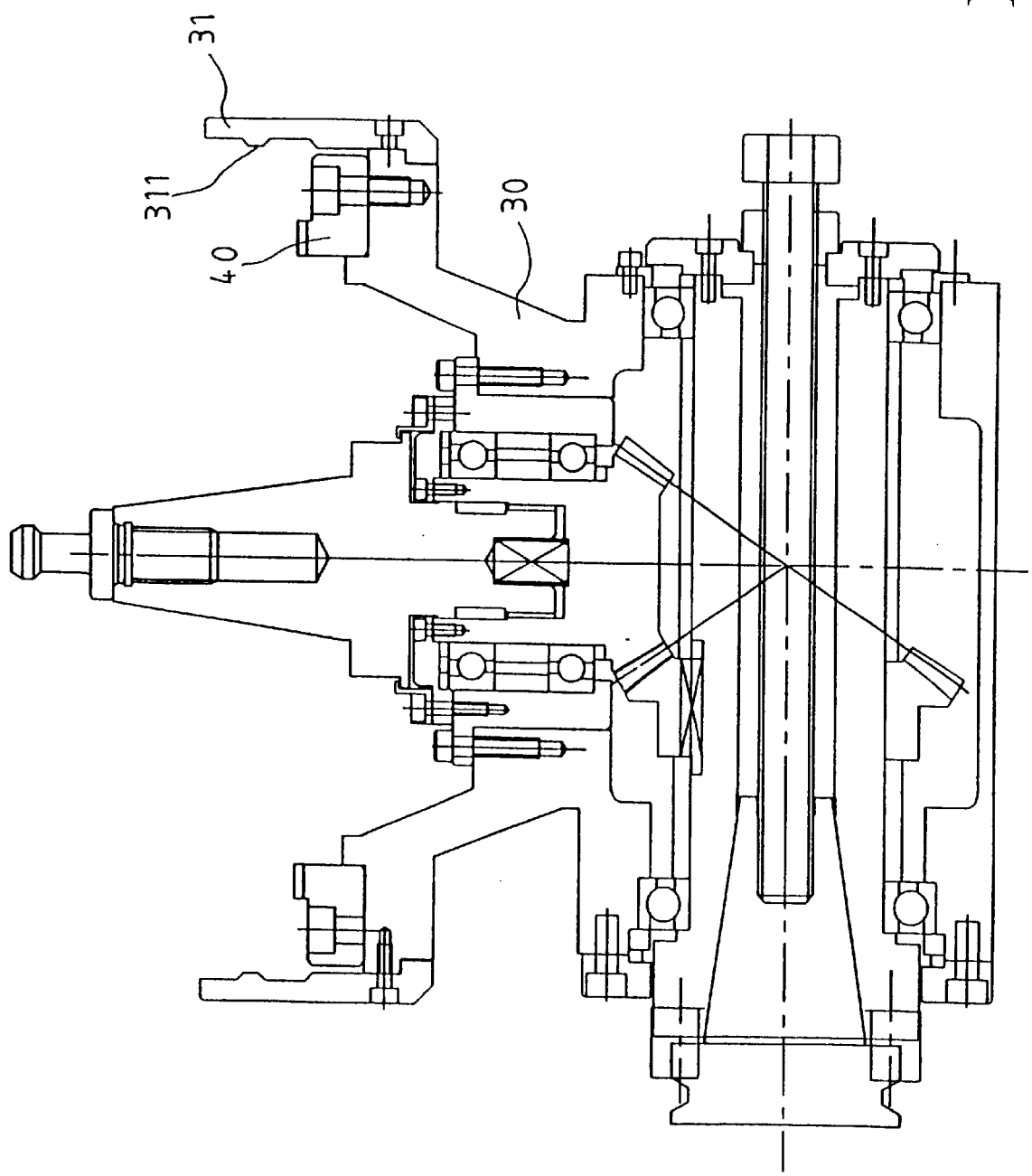
FIG. 5 shows a schematic view of a retaining block of an added head of the present invention.
Figure 6:
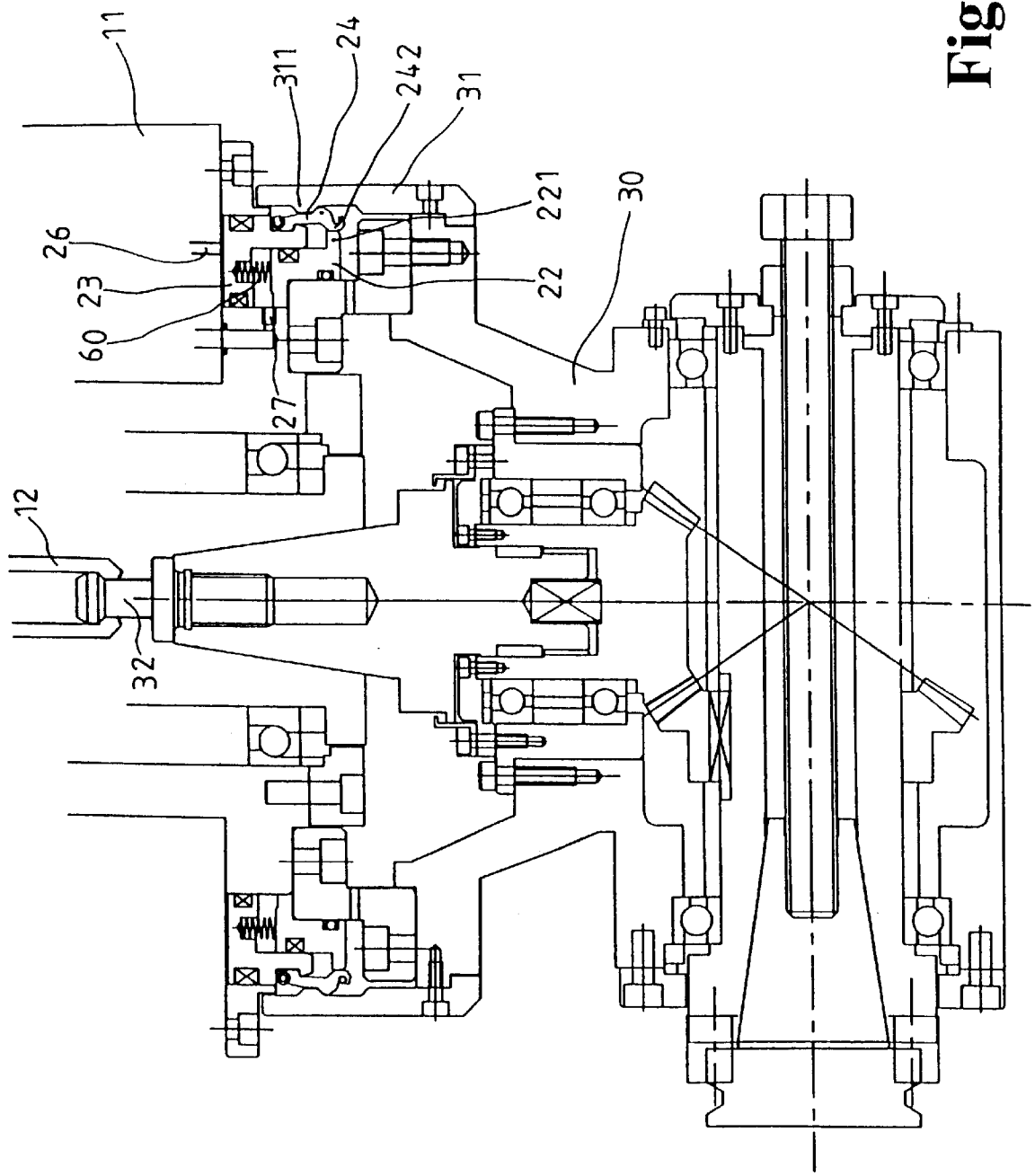
FIG. 6 shows a schematic view of fastening and locating an added head of the present invention with the main shaft of a numerical machine tool.
Figure 7:
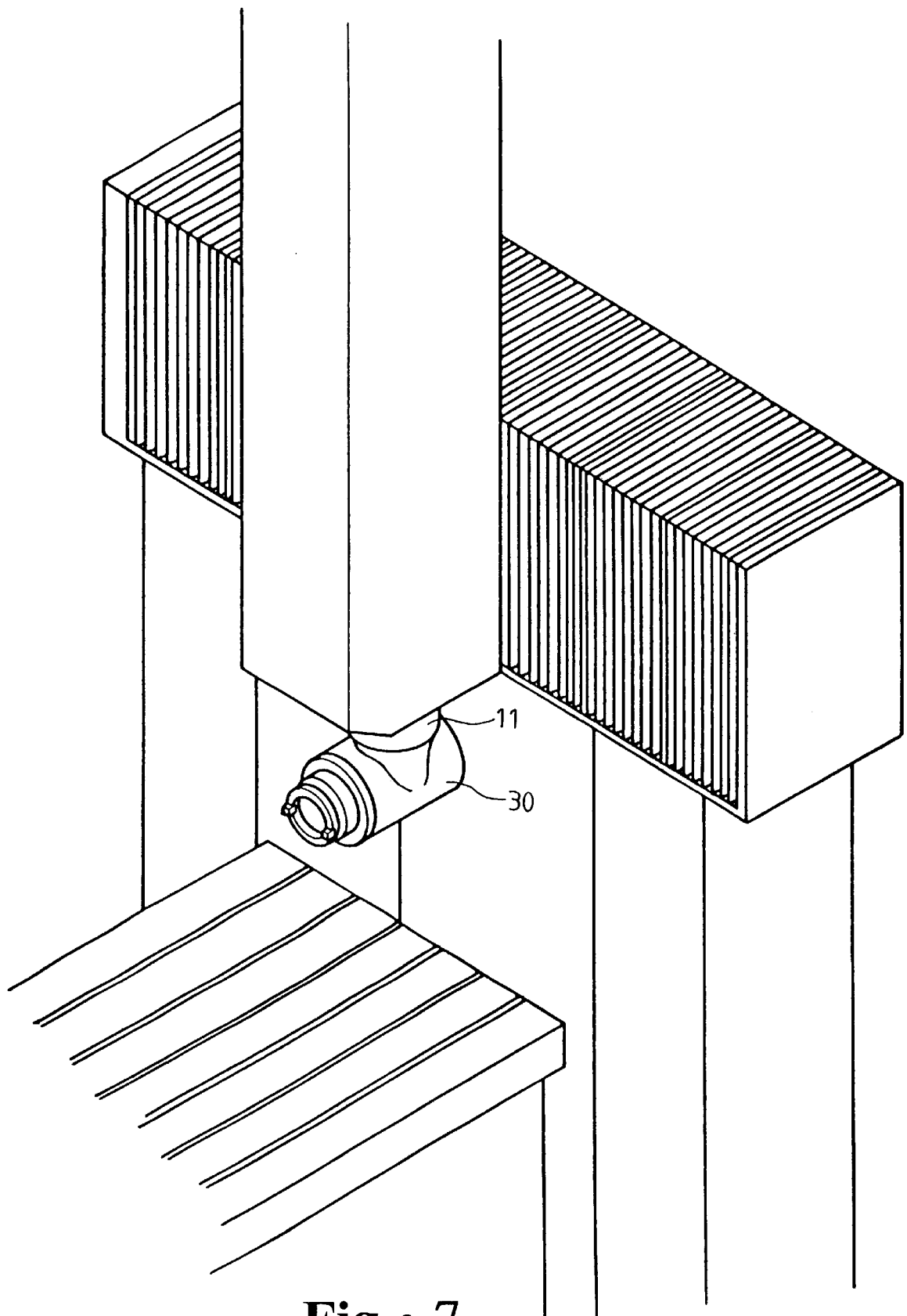
FIG. 7 shows a perspective view of a main shaft with the added head of the present invention being fastened therewith.

As shown in FIGS. 3–5, a fastening and locating device of the present invention comprises a piston 23, which is disposed between an upper cylinder mount 21 and a lower cylinder mount 22 of a main shaft 11 of a numerical machine tool. The piston 23 is provided with a pneumatic trough A, and a hydraulic trough B, which are connected with the pneumatic-hydraulic loops 26, and 27. The piston 23 is provided in the lower portion thereof with a retaining slot 231 in which a hooked portion 241 of an engagement block 24 is retained such that another hooked portion 242 of the engagement block 24 urges a projection 221 of the lower cylinder mount 22. The hooked portions 241 and 242 are provided therein with a spring 25. The engagement block 24 is provided in the outer side with a retaining portion 243. An added head 30 is provided with a retaining block 31 corresponding in location to the engagement block 24. The retaining block 31 is provided in the inner side with a protruded portion 311 corresponding to the retaining portion 243, as shown in FIGS. 5 and 6. The main shaft 11 is provided in the periphery with a crank-tooth coupler 40. The device of the present invention drives the pneumatic loop 26 such that the piston 23 actuates the engagement block 24 to displace downward, thereby resulting in the disengagement of the hooked portion 242 of the engagement block 24 with the projection 221 of the lower cylinder mount 22. As the spring 25 is compressed, the retaining block 31 of the added head 30 is disposed. The device of the present invention drives the hydraulic loop 27, so as to actuate the piston 23 to cause the engagement block 24 to rise, thereby causing the projection 221 of the lower cylinder mount 22 to urge the hooked portion 242 of the engagement block 24. As shown in FIGS. 6 and 7, when the added head 30 is fastened with the main shaft 11, the pneumatic loop 26 of the device of the present invention is started to enable the piston 23 to actuate the engagement block 24 to displace downward so as to cause the hooked portion 242 of the engagement block 24 to move away from the meantime, the main shaft 11 is lowered to locate over the added head 30 such that the tool retainer 12 of the main shaft 11 retains a tool sleeve 32 of the added head 30, and that the retaining block 31 of the added head 30 is located at the standby position. The hydraulic loop 27 is once again started to cause the piston 23 to actuate the engagement block 24 to rise thereby causing the hooked portion 242 of the engagement block 24 to be urged by the projection 221 of the lower cylinder mount 22. As a result, the hooked portion 242 of the engagement block 24 is engaged with a protrusion 311 of the retaining block 31 of the added head 30. The added head 30 is thus fastened with the main shaft 11 of the numerical machine tool.

Figure 8:
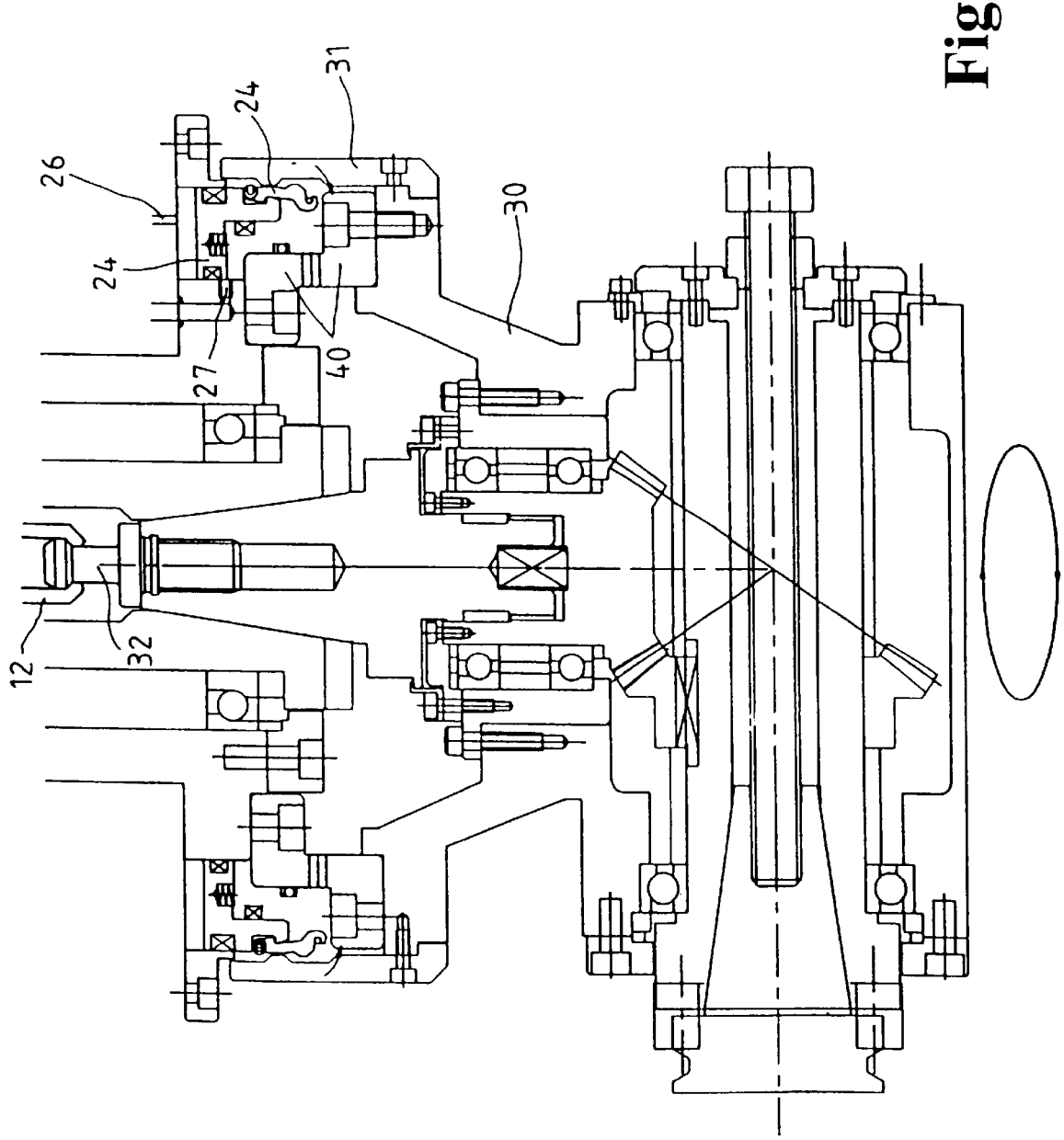
FIG. 8 shows a schematic view of the added head of the present invention being disengaged and turned.

As shown in FIGS. 8 and 9, when the added head 30 is to be provided with a tool for processing a different workpiece, the hydraulic loop 26 is started to cause the piston 23 to actuate the engagement block 24 to displace downward to result in the disengagement of the engagement block 24 with the retaining block 31 of the added head 30. The tool sleeve 32 of the added head 30 is still retained in suspension by the tool retainer 12 of the main shaft 11. The added head 30 is rotated to locate at a desired angle which the added head 30 is meshed with the crank-tooth coupler 40. The hydraulic loop 27 is then started to cause the piston 23 to actuate the engagement block 24 to return to the engagement position. In the meantime, the retaining block 31 of the added head 30. is located. As shown in FIG. 6, the present invention is provided with a spring 60, which is disposed between the piston 23 and the lower cylinder mount 22. The spring 60 is intended to assist the piston 23 in actuating the engagement block 24 to rise in case of the power interruption which cause the engagement block 24 to lose power to rise, thereby resulting in the disengagement of the added head 30 with the main shaft 11. Now referring to FIG. 10, the device of the present invention is shown being provided with a protective cover 50 before the device is engaged with the added head. The protective cover 50 is provided in the inner said with a retaining portion 51 corresponding to the retaining portion 243 of the engagement block 24. The protective cover 50 is retained by the engagement block 24 of the piston 23 such that the retaining portion 51 of the protective cover 50 is retained by the retaining portion 243 of the engagement block 24. The protective cover 50 is intended to provide the device of the present invention with protection against impact and dust.

The embodiment of the present invention described above is to be regarded in all respects as being merely illustrative and not restrictive. Accordingly, the present invention may be embodied in other specific forms without deviating from the spirit thereof. The present invention is thereof to be limited only by the scopes of the following appended claims.

What is claimed is:

1. An assembly for fastening the locating an added head of a numerical machine tool, said assembly comprising:
   an upper cylinder mount disposed in periphery of a main shaft of the numerical machine tool and provided with an urging portion and a pneumatic trough;
   a lower cylinder mount disposed in the periphery of the main shaft of the numerical machine tool and provided with a hydraulic trough and an urging portion opposite in location to said urging portion of said upper cylinder mount;
   a piston disposed between said upper cylinder mount and said lower cylinder mount and provided in a lower portion thereof with a retaining slot;
   an engagement block having two hooked portions, with one of said two hooked portions being retained in said retaining slot of said piston, and with other one of said two hooked portions being provided with a retaining portion, whereby said two hooked portions are provided with a spring;
   a hydraulic-pneumatic pipeline connected with said pneumatic trough of said upper cylinder mount and said hydraulic trough of said lower cylinder mount; and
   an added head having a retaining block, said retaining block provided with a protrusion corresponding in location to said retaining portion of said engagement block whereby said added head is adjustably fastened with the main shaft of the numerical machine tool such that said protrusion of said retaining block of said added head is engaged with said retaining portion of said hooked portion of said engagement block.

2. The assembly as defined in claim 1, wherein said main shaft is provided in a periphery with a crank-tooth coupler which is used to adjust an angular position of said added head.

3. The assembly as defined in claim 1 further comprising a spring which is disposed between said lower cylinder mount and said piston.

4. The assembly as defined in claim 1 further comprising a protective cover which is provided with a retaining portion corresponding in location to said retaining portion of said engagement block whereby said protective cover is retained by said piston such that said retaining portion of said protective cover is retained by said retaining portion of said engagement block of said piston.

5. The assembly as defined in claim 1, wherein said added head is a 9-degree head, a 30 degree head, or an extension head, and is compatible with the main shaft of an upright or horizontal numerical machine tool.

* * * * *